United States Patent
Rueschhoff et al.

(10) Patent No.: US 11,078,334 B1
(45) Date of Patent: Aug. 3, 2021

(54) CERAMIC NANOSTRUCTURES AND PROCESS FOR MAKING SAME

(71) Applicant: Government of the United States, as represented by the Secretary of the Air Force, Wright-Patterson AFB, OH (US)

(72) Inventors: Lisa M. Rueschhoff, Dayton, OH (US); Matthew B. Dickerson, Beavercreek, OH (US)

(73) Assignee: United States of Americas as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/572,723

(22) Filed: Sep. 17, 2019

Related U.S. Application Data

(60) Provisional application No. 62/756,647, filed on Nov. 7, 2018.

(51) Int. Cl.
| | |
|---|---|
| *C08L 83/04* | (2006.01) |
| *C08G 77/12* | (2006.01) |
| *C08G 77/06* | (2006.01) |
| *C08G 77/44* | (2006.01) |
| *C08G 77/20* | (2006.01) |

(52) U.S. Cl.
CPC ............. *C08G 77/12* (2013.01); *C08G 77/06* (2013.01); *C08G 77/20* (2013.01); *C08G 77/44* (2013.01); *C08L 83/04* (2013.01)

(58) Field of Classification Search
CPC .......... C08L 33/10; C08L 33/08; C08L 83/16; C08G 77/60
See application file for complete search history.

(56) References Cited

U.S. PATENT DOCUMENTS

| | | | |
|---|---|---|---|
| 4,017,820 | A | 4/1977 | Ross |
| 5,229,102 | A | 7/1993 | Minet et al. |
| 6,367,412 | B1 | 4/2002 | Ramaswamy et al. |
| 6,386,679 | B1 * | 5/2002 | Yang et al. |
| 6,730,802 | B2 | 5/2004 | Shen et al. |
| 7,029,634 | B2 | 4/2006 | Sherwood, Jr. |
| 7,714,092 | B2 | 5/2010 | Shen |
| 8,742,008 | B2 | 6/2014 | Shen et al. |
| 2003/0003127 | A1 | 1/2003 | Brown et al. |
| 2004/0161596 | A1 | 8/2004 | Taoka et al. |

FOREIGN PATENT DOCUMENTS

CN          106747402     *   5/2017

OTHER PUBLICATIONS

CN 10 674 7402 machine translation (2017).*
Wan, J.; Alizadeh, A.; Taylor, S. T.; Malenfant, P. R. L.; Manoharan, M.; Loureiro, S. M.; Nanostructured Non-oxide Ceramics Templated via Block Copolymer Self-Assembly. Chem. Mater. 2005, 17, 5613-5617.
Shi, Y.; Wan, Y.; Zhao, D.; Chem. Soc. Rev. Chem. Soc. Rev., 2011, 40, 3854-3878.
Chan, V. Z. H.; Hoffman, J.; Lee, V. Y.; Iatrou, H.; Avgeropoulos, A.; Hadjichristidis, N.; Miller, R. D.; Thomas, E. L.; Ordered Bicontinuous Nanoporous and Nanorelief Ceramic Films from Self Assembling Polymer Precursors. Science 1999, 286 (5445), 1716-1719.
Malenfant, P. R. L.; Wan, J.; Taylor, S. T.; Manoharan, M.; Self-assembly of an organic-inorganic block copolymer for nano-ordered ceramics. Nat. Nanotechnol. 2007, DOI 10.1038/nnano.2006.168, 43-46.
Shi, Y. F.; Meng, Y.; Chen, D. H.; Cheng, S. J.; Chen, P.; Yang, H. F.; Wan, Y.; Zhao, D. Y.; Highly Ordered Mesoporous Silicon Carbide Ceramics with Large Surface Areas and High Stability. Adv. Funct. Mater. 2006, 16, 561-567.
Kamperman, M.; Fierke, M. A.; Garcia, C. B. W.; Wiesner, U.; Morphology Control in Block Copolymer/Polymer Derived Ceramic Precursor Nanocomposites. Macromolecules 2008, 41, 8745-8752.
Susca, E. M.; Beaucage, P. A.; Hanson, M. A.; Werner-Zwanziger, U.; Zwanziger, J. W.; Estroff, L.A.; Wiesner, U.; Self-Assembled Gyroidal Mesoporous Polymer-Derived High Temperature Ceramic Monoliths. Chem. Mater. 2016, 28, 2131-2137.
Taylor, S. T.; Wan, J.; Malenfant, P. R. L.; Alizadeh, A.; Manoharan, M.; Morphology and Phase Ordering in Polymer-Derived Nanoceramics. Microsc Microanal 2006, 12(Supp 2), 568-569.
Wan, J.; Malenfant, P. R. L.; Taylor, S. T.; Loureiro, S. M.; Manoharan, M.; Microstructure of block copolymer/precursor assembly for Si—C—N based nano-ordered ceramics. Mater. Sci. Eng. 2007, A 463, 78-88.
Meza, L. R.; Das, S.; Greer, J. R.; Science 2014, 345 (6202), 1322-1326.
Bauer, J.; Hengsbach, S.; Tesari, I.; Schwaiger, R.; Kraft, O.; High-strength cellular ceramic composites with 3D microarchitecture. Proc. Natl. Acad. Sci. 2014, vol. 111, No. 7, 2453-2458.
Jang, D.; Meza, L. R.; Greer, F.; Greer, J. R.; Fabrication and deformation of three-dimensional hollow ceramic nanostructures. Nat. Mater. 2013, 12, 893, 1-6.
Rueschhoff, Lisa; Baldwin, Luke; Berrigan, J. Daniel; Koerner, Hilmar; Pruyn, Timothy; Dickerson, Matthew; Patterning of Preceramic Polymers via Macromolecular Self-assembly. ACS Presentation Mar. 21, 2018.

(Continued)

*Primary Examiner* — Kuo Liang Peng
(74) *Attorney, Agent, or Firm* — AFMCLO/JAZ; James F. McBride

(57) ABSTRACT

The present invention relates to gels and processes for making ceramic nanostructures, ceramic nanostructures made by such processes, and methods of using such ceramic nanostructures. Such process is templated via block copolymer self-assembly but does not require any post processing thermal and/or solvent annealing steps. As a result, such process is significantly more efficient and scalable than other processes that are templated via block copolymer self-assembly and yields a ceramic having a pore structure/shape that provides the ceramic with a higher ductility than traditional ceramics.

14 Claims, 1 Drawing Sheet

(56) References Cited

OTHER PUBLICATIONS

Rueschhoff, Lisa; Baldwin, Luke; Apostolov, Zlatomir; Koerner, Hilmar; Pruyn, Timothy; Cinibulk, Michael; Dickerson, Matthew; Processing of Organized Ceramic Thin Film Nanocomposites via Macromolecular Self-Assembly. ICACC Presentation Jan. 23, 2018.

Rueschhoff, Lisa; Baldwin, Luke; Berrigan, J. Daniel; Koerner, Hilmar; Pruyn, Timothy; Dickerson, Matthew; Architected Ceramic Nanomaterials via Macromolecular Self-Assembly. MRS Presentation Nov. 30, 2017.

Ly H. Q.; Taylor, R.; Day, R. J.; Heatley, F. Conversion of Polycarbosilane (PCS) to SiC-Based Ceramic Part I. Characterisation of PCS and Curing Products. J. Mater. Sci. 2001, 36, 4037-4043.

Ly, H. Q.; Taylor, R.; Day, R. J.; Heatley, F. Conversion of Polycarbosilane (PCS) to SiC-Based Ceramic Part II. Pyrolysis and characterisation. J. Mater. Sci. 2001, 36, 4045-4057.

Rathore, J. S.; Interrante, L. V. A Photocurable, Photoluminescent, Polycarbosilane Obtained by Acyclic Diene Metathesis (ADMET) Polymerization. Macromolecules 2009, 42 (13), 4614-4621.

Rangarajan, S.; Aswath, P. B. Role of Precursor Chemistry on Synthesis of Si—O—C and Si—O—C—N Ceramics by Polymer Pyrolysis. J. Mater. Sci. 2011, 46 (7), 2201-2211.

Whitmarsh, Chris K.; Interrante, Leonard V.; Synthesis and Structure of a Highly Branched Polycarbosllane Derived from (Chloromethyl)trichiorosilane. Organometallics. 1991, 10, 1336-1344.

Naviroj, M.; Miller, S. M.; Colombo, P.; Faber, K. T. Directionally Aligned Macroporous SiOC via Freeze Casting of Preceramic Polymers. J. Eur. Ceram. Soc. 2015, 35 (8), 2225-2232.

Colombo, P.; Mera, G; Riedel, R; Soraru', G.D.; Polymer-Derived Ceramics: 40 Years of Research and Innovation in Advanced Ceramics. J. Am. Ceram. Soc., 2010, 93 [7] 1805-1837.

\* cited by examiner

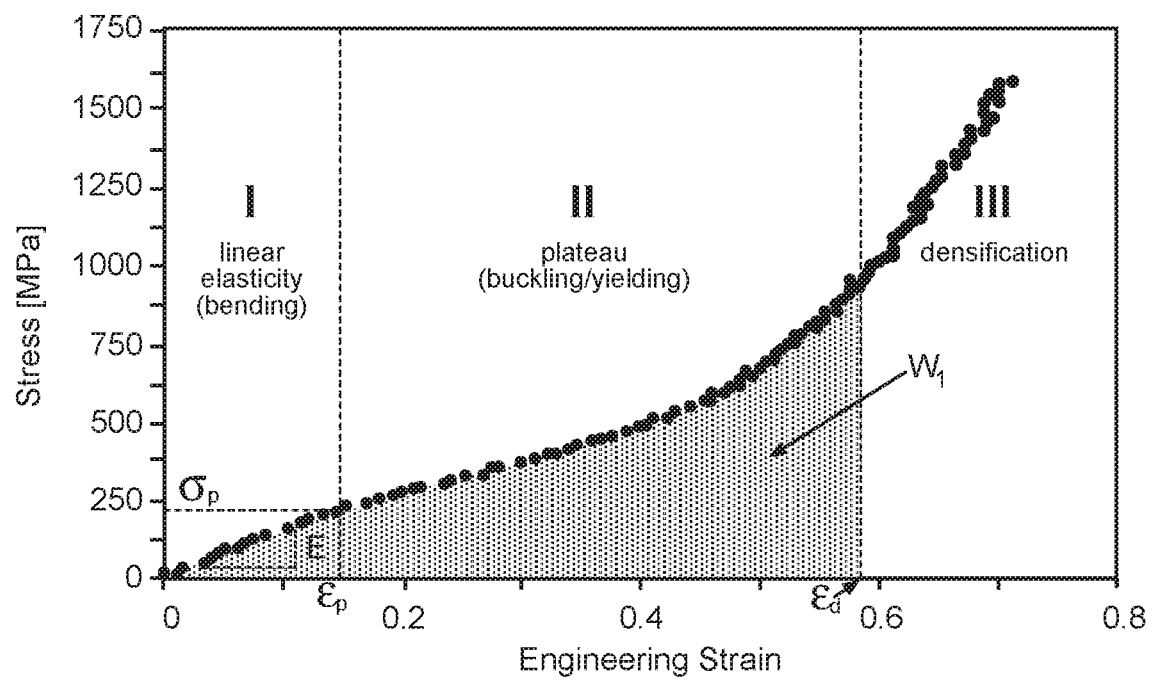

CERAMIC NANOSTRUCTURES AND PROCESS FOR MAKING SAME

CROSS-REFERENCE TO RELATED APPLICATION

The present application claims priority to U.S. Provisional Application Ser. No. 62/756,647 filed Nov. 7, 2018, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to gels and processes for making ceramic nanostructures, ceramic nanostructures made by such processes, and methods of using such ceramic nanostructures.

BACKGROUND OF THE INVENTION

Nanostructured ceramic materials are used for: porous filtration, as catalyst supports, biomedical devices, kiln furniture, components in solid oxide fuel cells, and light-weight structural components. They can also act a reinforcement phase for polymer, ceramic, and/or metal composites. A unique property of nanostructured ceramic materials is their ability for to undergo ductile compression with higher energy absorption compared to bulk ceramic parts. Thus, they maintain a high strength-to-weight ratio while being less susceptible to fast brittle fracture compared to bulk ceramic materials.

To achieve controlled nanostructures, elaborate processing techniques using either hard or soft templates are often utilized to surmount the inherent difficulty in processing ceramic materials. Polymer lattices produced via 3D laser lithography have been successfully used as hard templates by coating the 3D printed polymeric lattice with a ceramic material via atomic layer deposition. Subsequent polymer removal results in a ceramic metamaterial that is ultralight, strong, and energy absorbing due to the stretching dominated nanostructure. The use of soft templating techniques, such as macromolecular self-assembly with preceramic polymers, have also been used to manufacture ordered mesoporous ceramic materials with high specific surface area. Though elegant in approach and successful in achieving nanoarchitected materials, such processes have inherent limitations in scalability and template removal or self-assembly kinetics and do not yield a ceramic having a pore structure/shape that provides the desired ductility.

Applicants recognized that the source of the aforementioned problems was that a ceramic's comprise lattice structures that are not readily capable of plastic deformation and the fact that ceramics have a critical flaw size which if exceeded provides an avenue for failure such as crack propagation. Thus, Applicants discovered that the lattice structure drawback, could be reduced by keeping as many of the features of the ceramic to a level that is below the critical flaw size. Thus, Applicants disclose a gel that will yields a ceramic having a reduced number of features that are beyond the critical flaw size. Such ceramics are easily processed and in certain aspects comprise, a pore structure/shape (high aspect ratio wormlike pores) that yield high aspect ratio ceramic struts that surround wormlike mesopores that can undergo buckling, leading to higher ductility than traditional ceramic materials.

SUMMARY OF THE INVENTION

The present invention relates to gels and processes for making ceramic nanostructures, ceramic nanostructures made by such processes, and methods of using such ceramic nanostructures. Such process is templated via block copolymer self-assembly but does not require any post processing thermal and/or solvent annealing steps. As a result, such process is significantly more efficient and scalable than other processes that are templated via block copolymer self-assembly and yields a ceramic having a pore structure/shape that provides the ceramic with a higher ductility than traditional ceramics.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 1 is a graph depicting the results of the testing of ceramics made via the examples of the present specification.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within

Gels and Ceramics

A gel is disclosed, said gel comprising, based on total gel weight:

a) from about 4% to about 30%, preferably from about 5% to about 15%, preferably from about 6% to about 10% of a block co-polymer having a weight average molecular weight of from about 53,000 Da to about 77,000 Da, preferably from about 58,000 Da to about 72,000 Da, more preferably from about 61,000 Da to about 67,000 Da, said block co-polymer having Structure 1 below:

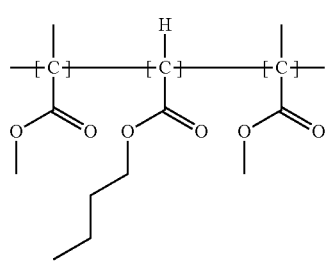

Structure 1 wherein the total weight ratio of

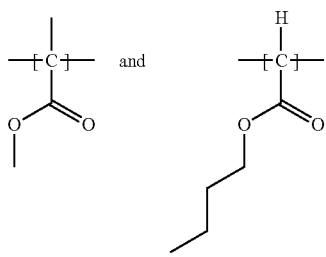

and in said block co-polymer is from about 1:3 to about 3:1, preferably from about 1:2 to about 2:1, more preferably about 1:1;

b) from about 0% to about 20%, preferably from about 5% to about 15%, preferably from about 6% to about 10% of a pre-ceramic polymer having a weight average molecular weight of from about 500 Da to about 100,000 Da, preferably from about 1,000 Da to about 25,000 Da, more preferably from about 2,000 Da to about 15,000 Da, said pre-ceramic polymer comprising units having Structure 2 below:

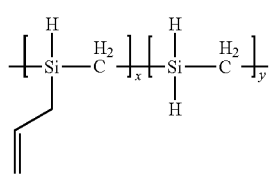

Structure 2 wherein the weight ratio of the moiety having indice $x$ to the moiety having indice $y$ is from about 10:1 to about 1:100, preferably from about 1:1 to about 1:50, more preferably about 1:10;

c) from about 0% to about 15%, preferably from about 1% to about 10%, preferably from about 2% to about 5% of a polymethylmethacrylate homopolymer having a weight average molecular weight of from about 1,000 Da to about 400,000 Da, preferably from about 10,000 Da to about 375,000 Da, more preferably from about 15,000 Da to about 350,000 Da and comprising a monomeric unit, the monomeric unit of said polymethylmethacrylate homopolymer having Structure 3 below:

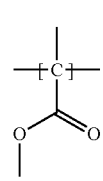

Structure 3 d) from about 60% to about 90%, preferably from about 70% to about 90%, preferably from about 80% to about 90%, of an amphilic solvent, preferably an amphilic solvent that comprises a hydroxyl moiety, most preferably a solvent selected from the group consisting of 2-ethylhexanol, 1-octanol, cyclohexanol and mixtures thereof, with the proviso that the combined weight percentage of said block co-polymer, pre-ceramic polymer, polymethylmethacrylate homopolymer and solvent does not exceed 100%.

The gel according to Paragraph 0016, wherein said pre-ceramic polymer is linear or hyper-branched, preferably when said pre-ceramic is hyper-branched, said pre-ceramic polymer comprises units having the following formula:

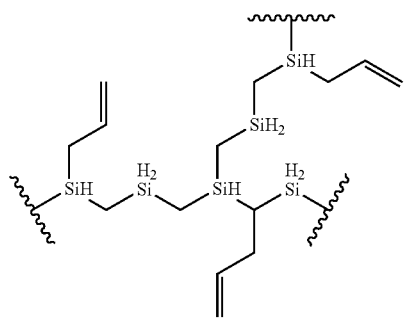

The gel according to any of Paragraphs 0016 through 0017 comprising, based on total gel weight:

a) from 5% to about 15% to about, preferably from about 5% to about 10%, more preferably from about 5% to about 8% of said pre-ceramic polymer b) from about 5% to about 30%, preferably from about 5% to about 25%, more preferably from about 5% to about 20% of said block co-polymer c) from about 0% to about 10%, preferably from about 0% to about 5%, more preferably from about 0% to about 2% of said polymethylmethacrylate homopolymer; and d) from 60% to about 90%, preferably from 70% to about 90% to about, more preferably from about 75% to 90% about solvent.

This gel can be used to efficiently produce a ceramic having a Spherical porosity structure. Such ceramics have a high surface area which is useful for catalysis.

The gel according to Paragraph 0016 comprising, based on total gel weight:
  a) from about 0% to about 15%, preferably from about 0% to about 12%, more preferably from about 0% to about 10% of said pre-ceramic polymer
  b) from about 5% to about 30%, preferably from about 5% to about 25%, more preferably from about 5% to about 20% of said block co-polymer
  c) from about 1% to about 10%, preferably from about 1% to about 8%, more preferably from about 1% to about 5% of said polymethylmethacrylate homopolymer; and
  d) from 60% to about 90% to about, preferably from 70% to about 90%, more preferably from about 80% to 87% about of said solvent.

This gel can be used to efficiently produce a ceramic having a Bicontinous Spherical porosity structure.

The gel according to Paragraph 0016 comprising, based on total gel weight:
  a) from about 1% to about 15%, preferably from about 5% to about 15%, more preferably from about 5% to about 10% of said pre-ceramic polymer
  b) from about 5% to about 30%, preferably from about 5% to about 20%, more preferably from about 5% to about 20% of said block co-polymer
  c) from about 1% to about 10%, preferably from about 1% to about 8%, more preferably from about 1% to about 5% of said polymethylmethacrylate homopolymer; and
  d) from 60% to about 90%, preferably from 70% to about 90%, more preferably from about 80% to 87% about of said solvent.

This gel can be used to efficiently produce a ceramic having a wormlike structure. Such ceramics have nanostructures that allowing buckling and thus deformation rather than cracking.

A ceramic having one or more of the following properties:
  a) a Young's Modulus: from about 1 GPa to about 2.3 GPa, preferably from about 1.2 GPa to about 2.0 GPa, more preferably from about 1.3 GPa to about 1.8 GPa;
  b) a Plateau Stress: from about 200 MPa to about 500 MPa, preferably from about MPa 200 to about 300 MPa, more preferably from about 215 MPa to about 260 MPa;
  c) a strain to failure of about 30% to about 70%, preferably from about 35% to about 65%, more preferably from about 40% to about 65%;
  d) an energy absorption of from about 0.5 nJ to about 2 nJ, preferably from about 0.5 nJ to about 1.5 nJ, more preferably from about 0.8 nJ to about 1.3 nJ.

Ceramic strength is measured as Young's Modulus and/or Plateau Stress, while ductility is measured as strain to failure and/or energy absorption.

Suitable block co-polymers, pre-ceramic polymers, polymethylmethacrylate homopolymers, and amphilic solvents can be obtained from Kuarary America Inc. (2625 Bay Area Boulevard, Suite 600, Houston, Tex.), Starfire Systems (8 Samowski Dr., East Glenville, N.Y.), Sigma Aldrich (3050 Spruce St., St. Louis, Mo., 63103), and Alfa Aesar (2 Radcliff Rd., Tewksbury, Mass.).

Processes of Making Gels and Ceramics

The following teachings and the teachings of the examples of the present specification will allow the skilled artisan to produce gels and ceramics.

Blends of block copolymer, for example, poly(methyl methacrylate)-b-poly(n-butyl acrylate)-b-poly(methyl methacrylate) and homopolymer poly(methyl methacrylate) are prepared by dissolving both in a solvent such as 2-ethylhexanol. The solution can be stirred if needed to dissolve the polymer. After the first polymers are fully dissolved, an additional polymer, for example, polycarbosilane polymer is added to the solution and mixed to dissolve such polymer. The mixture is allowed cool to approximately 25° C. This results in a gel having worm-like micelles.

Gels comprising spherical micelles are made by the process of Paragraph 0024 except no homopolymer is used.

Gels comprising spherical micelles are made by the process of Paragraph 0024 except 0.35 g block copolymer, 0.0875 g homopolymer, and 0.175 g polycarbosilane polymer are used.

Thin films can be made and the gels of Paragraphs 0024 through 0026 can be converted to into a ceramics as follows: Thin film samples (~1.0 μm thickness) are prepared by flow coating the polymer blend onto a silicon wafer substrate on a Peltier plate at ~65° C. The glass slide used as a blade was set to 500 μm and the stage velocity was 10 mm/s. As-deposited films were left in a fume hood for 16 hours for initial solvent evaporation, followed by freeze drying for further solvent removal. The films were thermally cured (to cross-link the polycarbosilane) in a vacuum oven where they were heated at 1° C./min and held at 160° C. and 230° C. for 1 h each. Pyrolysis was carried by raising the film temperature to 800° C. (1 h hold) in flowing argon gas in an alumina tube furnace equipped with a graphite sleeve at a heating rate of 1° C./min.

Methods of Using Ceramics

The ceramics disclosed herein may be used in almost any application requiring a ceramic. The ceramics disclosed herein are particularly suitable for applications wherein a higher ceramic ductility is desired. Such applications include catalysts, membranes, light-weight support structures, scaffolds, and energy storage materials (e.g. lithium-ion battery electrode). The skilled artisan can use the ceramics taught in the present specification in the aforementioned applications via the teaching of the present specification. Such application teachings can be supplemented by the teachings of U.S. Pat. No. 5,229,102 (porous ceramic catalytic membrane), U.S. Pat. No. 4,017,820 (porous ceramic humidity sensor), US20030003127A1 (porous ceramic composite tissue scaffold), U.S. Pat. No. 6,367,412 (porous ceramic for plasma source filter) and US20040161596A1 (porous ceramic for diesel particulate filter)

Test Methods

Compression testing: In-situ mechanical testing was used to determine strength and ductility of the resulting ceramic. SEM images during testing were acquired in a FEI Quanta SEM operating at 5.0 keV. Ceramic thin film micropillars (~0.8 μm film thickness, pillar radius 3-6 μm) were prepared through focused ion beam (FIB) milling in a Tescan Lyra-3 instrument using a gallium ion beam operating at 30 kV with a current of 66 pA. The annulus tool was used to create a pillar shape of the porous ceramic thin film on top of a silicon substrate. In-situ compression tests were completed using a micromechanical test frame manufactured by MicroTesting Solutions LLC with sample positioning (three degrees of freedom) enabled by piezoelectric stepper motion. Tip displacement was controlled through direct piezoelectric actuation. A flat tungsten tip (prepared via FIB milling to a diameter of approximately 6 μm) was used as a compression platen at a stroke rate of 100 nm/s, corresponding to a tip displacement of ~10 nm/min and a strain rate of $2 \times 10^{-4}$ 1/s. The thin film sample was securely fixed below the tungsten tip, and the tip was aligned in the SEM using nanometer sized steps. SEM images were acquired at 6 μs/pixel scan rate, with image resolution of 2000-3000 pixels/line.

A stress-strain curve as depicted in FIG. 1 is produced from the subsequent mechanical data. The SEM images taken during testing were used for strain measurements by application of digital image correlation methods. The cross sectional area of the thin film micropillar was used for the calculation of stress (where stress is equal to the measured force at each point divided by the area of the micropillar in contact with the compression platen). Telemetric force and displacement data are recorded during each image acquisition period, and the average value of force is reported for each displacement interval. The porosity was not accounted for in the area of the micropillar, resulting in an underestimation of applied load on the individual struts.

Method for Determining Young's Modulus (E): For purposes of the present specification, Young's modulus is determined as follows: A linear-best fit line model is used to calculate the slope of the stress-strain curve in region I (linear elasticity region). This is denoted as E in the stress-strain curve in FIG. 1.

Method for Determining Compressive Strength (Plateau Stress, σp)

For purposes of the present specification, Compressive strength (Plateau stress) is determined according to the compression test method outlined above for a single pillar compression test. The plateau stress is taken as the stress at which the stress-strain data transitions from a linear elastic (linear slope) to a flat, plateau region (region having the closest slope to a zero slope). See FIG. 1.

Method for Determining Strain to Failure (Strain at Densification, εd)

For purposes of the present specification, Strain to failure (strain at densification, εd) is determined according to the compression test method outlined above for a single pillar compression test. The strain to failure is taken as the strain at which the stress-strain data transitions from the Plateau stress to a densification region of high slope (region III on the stress-strain curve above). This value is denoted as εd in FIG. 1.

Method for Determining Energy Absorbed Per Unit Area (Work, $W_1$)

For purposes of the present specification, the energy absorbed per unit area, or work ($W_1$), is determined according to the compression test method outlined above for a single pillar compression test. The work is equal to the area under the stress-strain curve for regions I and II. This area is shaded in FIG. 1 and is denoted as $W_1$ in FIG. 1.

Examples

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1 Worm-like micelles: All chemicals were used as received without modification or purification. Blends of block copolymer poly(methyl methacrylate)-b-poly(n-butyl acrylate)-b-poly(methyl methacrylate) (0.35 g) and homopolymer poly(methyl methacrylate) (0.0875 g) were prepared by dissolving both in 4.3 g of 2-ethylhexanol solvent at 90° C. into a capped 20 mL glass vial. A small stir bar was used to mix the solution for approximately 30 min to dissolve the polymer. After the first polymers were fully dissolved, 0.35 g of polycarbosilane polymer was added in and mixed in at 70° C. for approximately 5 minutes to dissolve. The mixture is allowed cool to 25° C. This results in a gel having worm-like micelles.

Example 2 Spherical micelles: The same process as in Example 1 is employed except no homopolymer is used. This results in a gel having spherical micelles.

Example 3 Bicontinuous spherical: The same process as in Example 1 is employed except 0.35 g block copolymer, 0.0875 g homopolymer, and 0.175 g polycarbosilane polymer are used. This results in a gel having bicontinuous spherical micelles.

Method for making thin film and converting to Examples 1 through 3 into a ceramic: Thin film samples (~1.0 μm thickness) were prepared by flow coating the polymer blend onto a silicon wafer substrate (washed with ethanol, methanol, and UV-ozone cleaned) on a Peltier plate at ~65° C. The glass slide used as a blade was set to 500 μm and the stage velocity was 10 mm/s. As-deposited films were left in a fume hood for 16 hours for initial solvent evaporation, followed by freeze drying for further solvent removal. The films were thermally cured (to cross-link the polycarbosilane) in a vacuum oven where they were heated at 1° C./min and held at 160° C. and 230° C. for 1 h each. Pyrolysis was carried by raising the film temperature to 800° C. (1 h hold) in flowing argon gas in an alumina tube furnace equipped with a graphite sleeve at a heating rate of 1° C./min.

Testing of Ceramics Made Via The Present Examples: A Bruker Dimension AFM was used in tapping mode with a ~5 nm tip on a silicon cantilever (SSS-NCHR). The cantilevers resonance frequency was roughly 330 kHz. SEM images were taken in a Zeiss Gemini 500 field emission SEM operated at 0.5 keV and TEM images were taken in a FEI Talos operating in STEM mode with all samples sputter coated with ~10 nm of iridium.

Ceramics made in the examples section of the present specification are tested in accordance with the Compression Testing Method provided in the Test Methods section of the present specification. The data obtained is provided below and depicted in FIG. 1.

| Young's Modulus, E [MPa] | Strain at Plateau, $\varepsilon_p$ | Stress at Plateau, $\sigma_p$ [MPa] | Energy Absorbed Per Unit Area, $W_1$ [MPa] (nJ) | Strain at Densification, $\varepsilon_d$ |
|---|---|---|---|---|
| 1435 | 0.15 | 224 | 207 (0.9) | 0.57 |

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A gel comprising, based on total gel weight:
   a) from about 4% to about 30%, of a block co-polymer having a weight average molecular weight of from about 53,000 Da to about 77,000 Da, said block co-polymer having Structure 1 below:

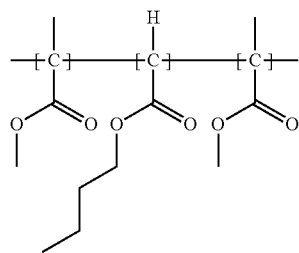

Structure 1 wherein the total weight ratio of

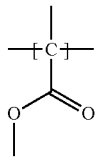 and 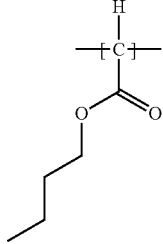

in said block co-polymer is from about 1:3 to about 3:1;
   b) from about 0% to about 20% of a pre-ceramic polymer having a weight average molecular weight of from about 500 Da to about 100,000 Da, said pre-ceramic polymer comprising units having Structure 2 below:

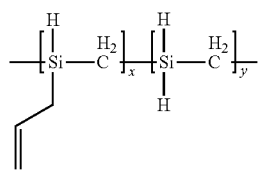

Structure 2 wherein the weight ratio of the moiety having indice x to the moiety having indice y is from about 10:1 to about 1:100;
   c) from about 0% to about 15% of a polymethylmethacrylate homopolymer having a weight average molecular weight of from about 1,000 Da to about 400,000 Da and comprising a monomeric unit, the monomeric unit of said polymethylmethacrylate homopolymer having Structure 3 below:

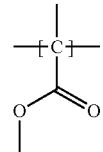

Structure 3 d) from about 60% to about 90% of an amphilic solvent, with the proviso that the combined weight percentage of said block co-polymer, pre-ceramic polymer, polymethylmethacrylate homopolymer and solvent does not exceed 100%.

2. The gel according to claim 1 comprising, based on total gel weight:
   a) from about 5% to about 15% of a block co-polymer having a weight average molecular weight of from about 58,000 Da to about 72,000 Da, said block co-polymer having Structure 1 below:

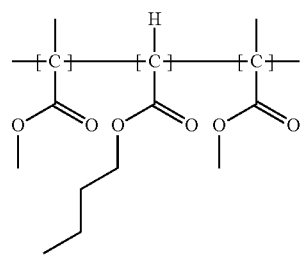

Structure 1 wherein the total weight ratio of

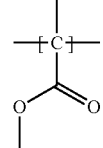 and 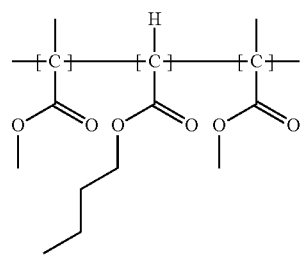

in said block co-polymer is from about 1:2 to about 2:1;
   b) from about 5% to about 15% of a pre-ceramic polymer having a weight average molecular weight of from about 1,000 Da to about 25,000 Da, said pre-ceramic polymer comprising units having Structure 2 below:

Structure 2 wherein the weight ratio of the moiety having indice x to the moiety having indice y is from about 1:1 to about 1:50;
   c) from about 1% to about 10% a polymethylmethacrylate homopolymer having a weight average molecular weight of from about 10,000 Da to about 375,000 Da and comprising a monomeric unit, the monomeric unit of said polymethylmethacrylate homopolymer having Structure 3 below:

Structure 3

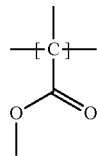

d) from about 70% to about 90% of an amphilic solvent that comprises a hydroxyl moiety, with the proviso that the combined weight percentage of said block co-polymer, pre-ceramic polymer, polymethylmethacrylate homopolymer and solvent does not exceed 100%.

3. The gel according to claim 2 comprising, based on total gel weight:
   a) from about 6% to about 10% of a block co-polymer having a weight average molecular weight of from about 61,000 Da to about 67,000 Da, said block co-polymer having Structure 1 below:

Structure 1

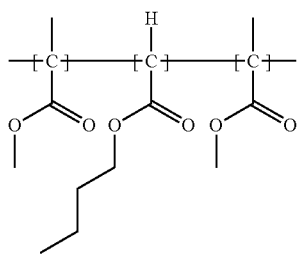

wherein the total weight ratio of

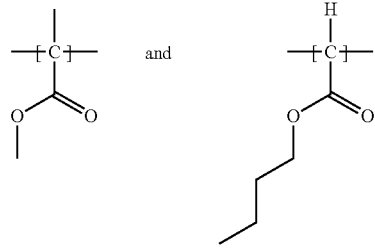

in said block co-polymer is about 1:1;
   b) from about 6% to about 10% of a pre-ceramic polymer having a weight average molecular weight of from about 2,000 Da to about 15,000 Da, said pre-ceramic polymer comprising units having Structure 2 below:

Structure 2

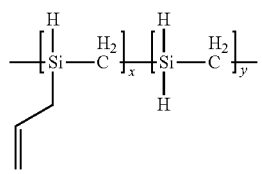

wherein the weight ratio of the moiety having indice x to the moiety having indice y is about 1:10;
   c) from about 2% to about 5% a polymethylmethacrylate homopolymer having a weight average molecular weight of from about 15,000 Da to about 350,000 Da and comprising a monomeric unit, the monomeric unit of said polymethylmethacrylate homopolymer having Structure 3 below:

Structure 3

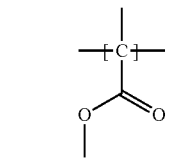

d) from about 80% to about 90%, of a solvent selected from the group consisting of 2-ethylhexanol, 1-octanol, cyclohexanol and mixtures thereof, with the proviso that the combined weight percentage of said block co-polymer, pre-ceramic polymer, polymethylmethacrylate homopolymer and solvent does not exceed 100%.

4. The gel according to claim 1 wherein said pre-ceramic polymer is linear or hyper-branched.

5. The gel according to claim 1 wherein said pre-ceramic is hyper-branched, said pre-ceramic polymer comprising units having the following formula:

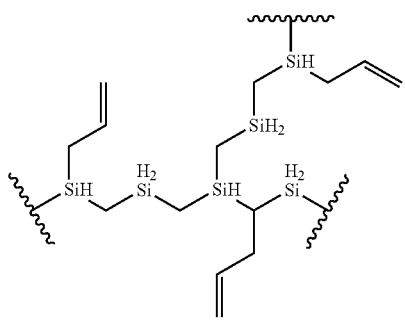

6. The gel according to claim 1 comprising, based on total gel weight:
   a) from about 5% to about 30%, of said block co-polymer;
   b) from 5% to about 15% of said pre-ceramic polymer;
   c) from about 0% to about 10%, of said polymethylmethacrylate homopolymer; and
   d) from 60% to about 90% of said amphilic solvent.

7. The gel according to claim 1 comprising, based on total gel weight:
   a) from about 5% to about 25% of said block co-polymer;
   b) from about 5% to about 10% of said pre-ceramic polymer;
   c) from about 0% to about 5% of said polymethylmethacrylate homopolymer; and
   d) from 70% to about 90% of said amphilic solvent.

8. The gel according to claim 1 comprising, based on total gel weight:
   a) from about 5% to about 20% of said block co-polymer;
   b) from about 5% to about 8% of said pre-ceramic polymer;
   c) from about 0% to about 2% of said polymethylmethacrylate homopolymer; and
   d) from about 75% to 90% about of said amphilic solvent.

9. The gel according to claim 1 comprising, based on total gel weight:
   a) from about 5% to about 30% of said block co-polymer;
   b) from about 0% to about 15% of said pre-ceramic polymer;
   c) from about 1% to about 10% of said polymethylmethacrylate homopolymer; and
   d) from 60% to about 90% of said amphilic solvent.

10. The gel according to claim 1 comprising, based on total gel weight:
    a) from about 5% to about 25% of said block co-polymer;
    b) from about 0% to about 12% of said pre-ceramic polymer;
    c) from about 1% to about 8% of said polymethylmethacrylatehomopolymer; and
    d) from 70% to about 90% of said amphilic solvent.

11. The gel according to claim 1 comprising, based on total gel weight:
    a) from about 5% to about 20% of said block co-polymer;
    b) from about 0% to about 10% of said pre-ceramic polymer;
    c) from about 1% to about 5% of said polymethylmethacrylate homopolymer; and
    d) from about 80% to 87% about of said amphilic solvent.

12. The gel according to claim 1 comprising, based on total gel weight:
    a) from about 5% to about 30% of said block co-polymer;
    b) from about 1% to about 15% of said pre-ceramic polymer;
    c) from about 1% to about 10% of said polymethylmethacrylate homopolymer; and
    d) from 60% about 90% to about of said amphilic solvent.

13. The gel according to claim 1 comprising, based on total gel weight:
    a) from about 5% to about 20% of said block co-polymer;
    b) from about 5% to about 15% of said pre-ceramic polymer;
    c) from about 1% to about 8% of said polymethylmethacrylate homopolymer; and
    d) from 70% about 90% to about of said amphilic solvent.

14. The gel according to claim 1 comprising, based on total gel weight:
    a) from about 5% to about 20% of said block co-polymer;
    b) from about 5% to about 10% of said pre-ceramic polymer;
    c) from about 1% to about 5% of said polymethylmethacrylate homopolymer; and
    d) from about 80% to 87% about of said amphilic solvent.

* * * * *